United States Patent [19]

Colas

[11] Patent Number: 4,627,149

[45] Date of Patent: Dec. 9, 1986

[54] METHOD OF MOUNTING AN ANNULAR ELEMENT ON A METAL TUBE OF ALUMINUM OR AN ALLOY THEREOF

[75] Inventor: François Colas, Bourg La Reine, France

[73] Assignee: Cegedur Societe de Transformation de l'Aluminium Pechiney, Paris, France

[21] Appl. No.: 600,831

[22] Filed: Apr. 16, 1984

[30] Foreign Application Priority Data

Apr. 20, 1983 [FR] France ................................ 83 06874

[51] Int. Cl.⁴ ...................... B21D 39/00; B23P 11/00
[52] U.S. Cl. ......................................... 29/516; 29/237; 29/283.5; 29/520; 29/525; 182/228; 403/282
[58] Field of Search ................ 29/516, 520, 237, 525, 29/283.5; 182/228; 403/282

[56] References Cited

U.S. PATENT DOCUMENTS

| | | | |
|---|---|---|---|
| 1,192,927 | 8/1916 | Mosher | 29/520 UX |
| 2,862,732 | 12/1958 | Guillou | 29/520 UX |
| 3,039,186 | 6/1962 | Stoyer et al. | 182/228 X |
| 3,201,859 | 8/1965 | Stanley | 29/520 X |
| 3,827,727 | 8/1974 | Moebius | 29/520 X |
| 3,972,112 | 8/1976 | O'Sickey et al. | 29/520 X |
| 4,061,367 | 12/1977 | Moebius | 29/520 X |
| 4,114,930 | 9/1978 | Perkins et al. | 29/520 X |
| 4,325,571 | 4/1982 | Funderburg et al. | 29/520 X |
| 4,389,134 | 6/1983 | Colas | 403/282 X |

Primary Examiner—Charlie T. Moon
Attorney, Agent, or Firm—Oblon, Fisher, Spivak, McClelland & Maier

[57] ABSTRACT

A method of mounting an annular element on a tube which involves surrounding said tube by a tubular sleeve of aluminum or an alloy thereof, which is sufficiently thin to be plastically deformable and has a similar cross-section, with suitable clearance, with one of the sleeve ends having an outside bevel; surrounding said tube, on the side of the sleeve bevel, with an annular element to be fastened, wherein the annular element has at least one opening whose crosswise dimensions are greater than those of the tube, but whose radial clearance with said tube is less than the thickness of the sleeve, and which has, on the sleeve side, an inside bevel whose maximum crosswise dimensions are greater than the crosswise dimensions of the end of the element and the sleeve toward one another, by a suitable means, and introducing the sleeve, by force, between the annular element and the tube by plastically deforming the sleeve and tube, thereby mounting the annular element.

The present method is used advantageously, for example, for frameworks, bridges, scaffolding and offshore drilling platforms.

8 Claims, 3 Drawing Figures

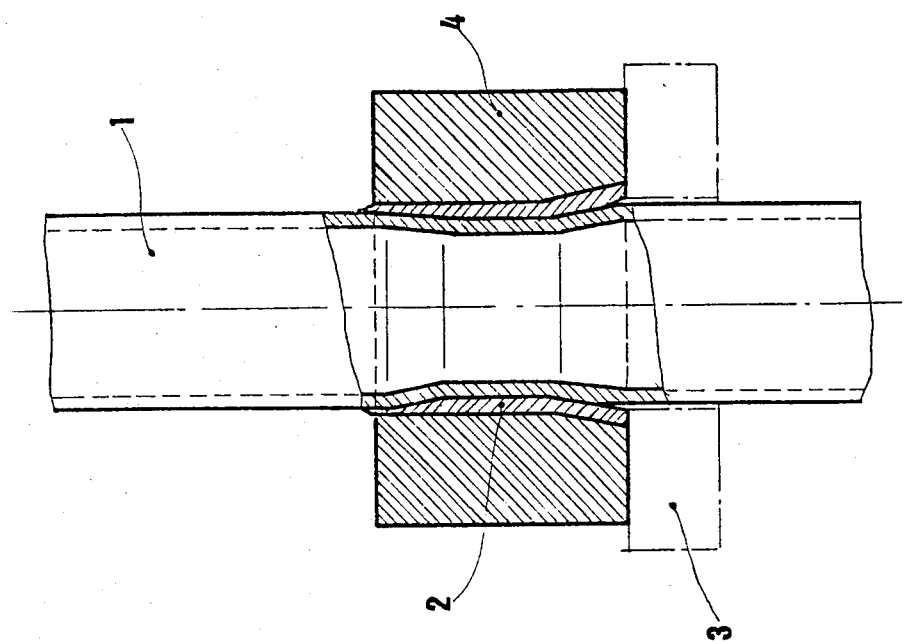
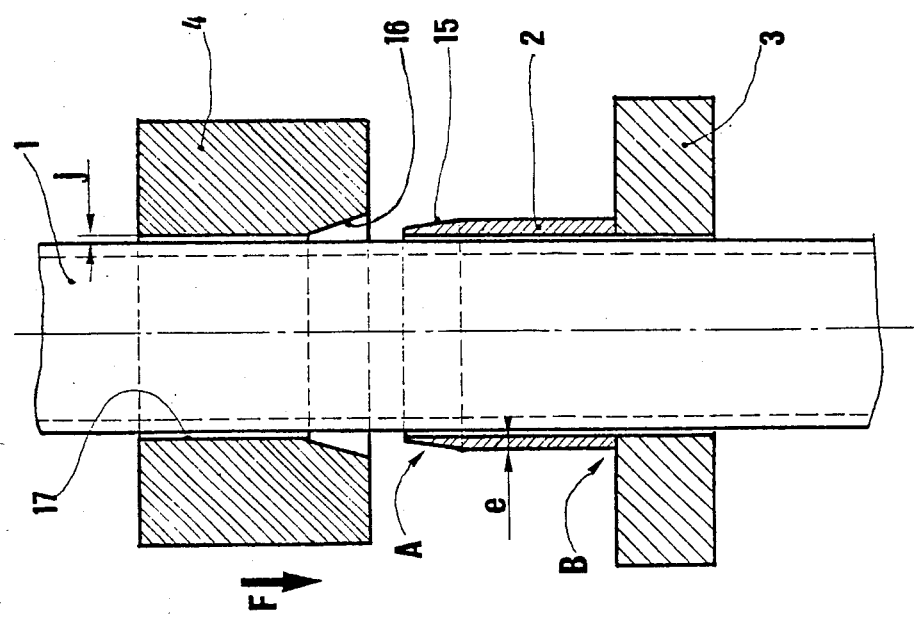

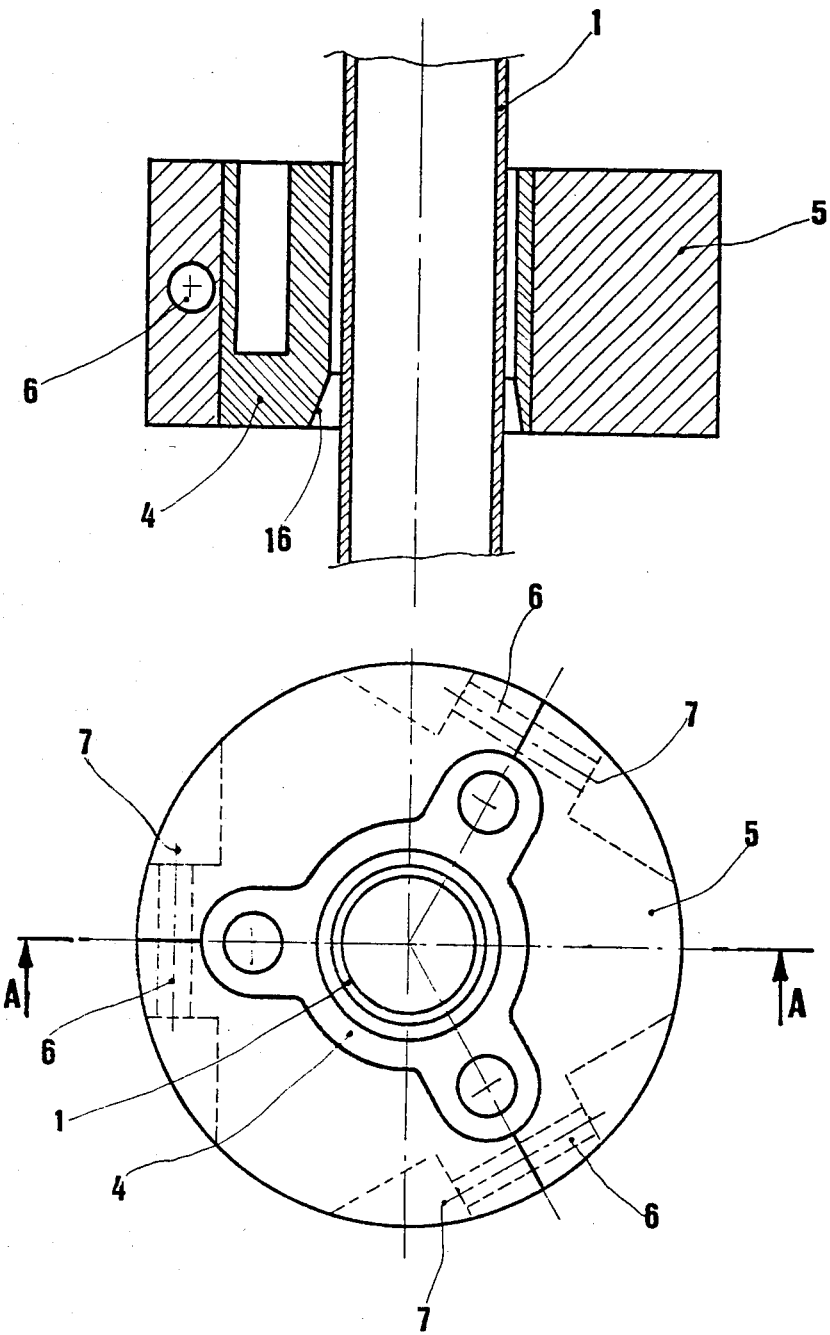

METHOD OF MOUNTING AN ANNULAR ELEMENT ON A METAL TUBE OF ALUMINUM OR AN ALLOY THEREOF

BACKGROUND OF THE INVENTION

1. Field of the Invention

This invention relates to a method of mounting an annular element on a relatively thin metal tube.

2. Description of the Prior Art

The fastening of an item, such as a collar, around a tube can be performed in numerous ways such as welding, hooping or mechanical fastening with screws. However, all of these conventional operations are long, complex and often require special equipment. To date, a simpler means of fastening items around a tube has remained unknown.

Hence, a need continues to exist for a means of fastening items around a tube, which is simpler than the conventional means and which does not require special equipment.

SUMMARY OF THE INVENTION

Accordingly, it is an object of the present invention to provide a method of mounting an annular element on a relatively thin metal tube which is much simpler than the conventional means of fastening.

It is also an object of this invention to provide a method of mounting an annular element on a relatively thin metal tube which does not require special equipment.

According to the present invention, the foregoing and other objects are attained by providing a process for mounting an annular element on a tube, which entails surrounding the tube with a tubular sleeve of aluminum or an alloy thereof, which is relatively thin and has a similar cross-section, with suitable clearance, with one of the ends of the sleeve having an outside level; surrounding the tube, on the side of the sleeve bevel, with an annular element to be fastened; moving the annular element and sleeve toward one another by a suitable means; and introducing the sleeve between the annular element and the tube by plastically deforming the sleeve and tube, thereby mounting the annular element.

BRIEF DESCRIPTION OF THE DRAWINGS

Other objects, features and attendant advantages of the present invention will be more fully appreciated as the same becomes better understood from the following detailed description when considered in connection with the accompanying drawings in which like reference characters designate like or corresponding parts and wherein:

FIG. 1 shows an axial sectional view of the arrangement of the elements before mounting;

FIG. 2 shows an axial sectional view of the arrangement of the elements after mounting; and FIG. 3 represents a plan view (3b) and axial section (3a) of an annular element with thin walls, encircled by a temporary hoop.

DETAILED DESCRIPTION OF THE PREFERRED EMBODIMENT

According to the present invention, a simple method of mounting an annular element on a relatively thin tube has now been provided. Generally, the present invention relates to an annular element and a tube of circular section. However, the present invention is also applicable to an annular element and a tube having other cross sections such as square, rectangular, oval or even polygonal, preferably with rounded edges and convex faces. The present method can be used with a simple shop press or even with a hand press that is portable and can be used on site.

In order to practice the method of the present invention, first a tube is surrounded with a tubular sleeve of aluminum or an alloy thereof, which has a relatively thin cross-section, with an adequate clearance, with one of the sleeve ends having an outside bevel. Then, the tube is surrounded on the bevel side of the sleeve with the annular element that is to be fastened.

The annular element to be fastened has at least an opening wnose crosswise dimensions are greater than those of the tube, but whose radial clearance with the tube is a less than the thickness of the sleeve, and which is provided, on the sleeve side, with an inside bevel whose maximum crosswise dimensions are greater than the crosswise dimensions of the end of the sleeve without the bevel.

If the annular element is sufficiently solid, the annular element and sleeve are moved toward one another by a suitable means and the sleeve is introduced by force between the annular element and tube by plastically deforming the sleeve and tube, thereby mounting the annular element.

As a variation, if the annular element exhibits at least partially thin walls or parts in the vicinity of the opening, after the second step above, it is temporarily surrounded by an additional solid, removable part which can be referred to as a "hoop", intended to resist the splitting forces during the forcing operation (3) which follows, after which:

(4) said hoop is dismounted and eliminated.

Forcing operation (3) can be performed by movement of the annular element (mobile) toward the sleeve (stationary) made solid, for example, in a temporary stop, or vice versa (stationary annular element and mobile sleeve).

In this process, the annular element, which can be of any sufficiently resistant material, is either one-piece or in one or more lengthwise parts mounted together and around the tube by known means, for example, bolting, clipping, or optionally by welding. In this latter case, the method can be used on tubes that are already part of an existing structure such as beams, or frameworks, for example.

Also, the annular element can comprise several openings, exhibiting different directions in relation to one another, for example, to make framework scaffolding junctions.

The sleeve can also be one-piece or in one or more lengthwise parts and even shaped from an initially beveld sheet rolled in the shape of a cylinder split along a generatrix, the initial bevel forming the bevel.

In the method described above, the tubes and sleeves should be relatively thin to be plastically deformable, while having sufficient rigidity. Preferably, therefore, the following relations are used:

$$\frac{1}{25} < \frac{\text{thickness of the tube}}{\text{outside diameter of the tube}} < \frac{1}{4}$$

and the thickness of the sleeve is between about 0.15 mm and 2 times the thickness of the tube.

The mechanical resistance of the mounting is a function of the "locking" of the sleeve in the clearance between the tube and thus, the annular part, and also of the length of the mounting.

The following limitations are preferable:

$$0.001 < \frac{\text{clearance between annular part and tube}}{\text{outside diameter of the tube}} < 0.01$$

and the length of the tube is between about 1/10 and 3 times the outside diameter of the tube.

The angles of bevel, in relation to the axis, are generally between about 5° and 10°; they are preferably of equal value on the sleeve and annular part, although the angle of bevel of the annular part can be greater than that of the bevel on the tube.

The method of the present invention, in addition to its ability to be quickly executed, has several other advantages. First, tne mounting, in itself, constitutes a local reinforcement of the structure by the triple effect of the extra thickness, the strain hardening of the tube and sleeve and hooping by the annular part.

On tube (1) of circular section is placed a cylindrical sleeve (2) which rests on a detachable stop (3) by its end B and whose other end A is beveled on tne outside at (15). Annular element (4), provided witn an opening (17), is also slipped on tube (1), its A side end being beveled on the inside at (16). By forcing of element (4) on the sleeve (2) in the direction of F, parallel to the axis of the tube, the sleeve and annular element, the mounting shown in FIG. 2 is obtained, where the tube and sleeve are plastically deformed by hammering during forcing.

FIG. 3 shows, before mounting, an annular element (4) with relatively thin walls, in the shape of a three-pointed star, encircled by a hoop (5) that can be dismounted in three parts, which are mounted by bolts (7)—not shown—going through fastening holes (6).

The present invention will be further illustrated by certain examples and references which are provided for purposes of illustration only and are not intended to limit the present invention.

EXAMPLE

A sleeve of AG S 6181T5, with an inside diameter of 32.5 mm, a thickness of 2 mm and 40 mm long, was placed around a tube of 5086, according to the Aluminum Association designation, ¾ hard, with an outside diameter of 32 mm and a thickness of 2 mm. A bevel with a 7° slope in relation to the axis of the tube was made for 15 mm on the end of the sleeve.

An inside bevel of 7° over 15 mm was machined on the annular part of AG S 6181T6 provided with an opening with an inside diameter of 32.5 mm and 40 mm long.

The sleeve was greased with tallow and the parts were mounted with a 20-ton press, the sleeve being placed on the table and the force in the direction F transmitted to the annular part by a thick tube element which was slipped on the tube to be mounted.

The mounting thus obtained resisted a pull of 5 tons in the direction of F and 2.5 tons in the direction opposite to F.

The invention has its application in the following fields: frameworks, bridges, gangplanks, scaffolding, airframes (ultralight aircraft), racks and shelves, and offshore drilling platforms, for example.

Having now fully described this invention, it will be apparent to one of ordinary skill in the art that many changes and modifications can be made thereto without departing from the spirit or scope of the inventioin as set forth herein.

What is claimed as new and desired to be secured by Letters Patent of the United States is:

1. A method for mounting an element on a metal tube, which comprises:

surrounding the said tube by a tubular sleeve of aluminum or an alloy thereof, which is sufficiently thin to be plastically deformable and have a similar cross-section, with suitable clearance, with one of the sleeve ends having an outside bevel;

surrounding said tube, on the side of the sleeve bevel, with an annular element to be fastened, wherein said annular element has an external shape and at least one opening whose crosswise dimensions are greater than those of said tube, and whose radial clearance with said tube is less than the thickness of said sleeve, and which has, on the sleeve side, an inside bevel whose maximum crosswise dimensions are greater than the crosswise dimensions of the end of the sleeve without the bevel;

temporarily surrounding and supporting said annular element with a detachable hoop having an internal shape and size corresponding to said shape and size of said annular element;

moving the beveled end of said annular element and the beveled end of said sleeve toward one another by a suitable means, and introducing said sleeve by force between the annular element and said tube while radially inwardly plastically deforming and interlocking said sleeve and said tube, said sleeve being radially inwardly plastically deformed over substantialy its whole length, thereby permanently mounting the said annular element on said tube without deforming said external shape of said annular element; and removing said hoop.

2. The method of claim 1, wherein the thickness of said tube is between about ¼ and 1/25 of the outside diameter, or crosswise dimension, of said tube, and the thickness of said sleeve is between about 0.5 mm and twice the thickness of said tube.

3. The method of claim 1, wherein the clearance between the annular element and the tube is between about 0.001 and 0.01 times the outside diameter, or crosswise dimension, of the tube and the length of the sleeve is between about 0.1 and 3 times the outside diameter, or crossw1se dimension, of the tube.

4. The method of claim 1, wherein the angles of the bevels with the axis of the tube are between about 5° to 10°.

5. The method of claim 1, wherein said annular element has more than one opening, each exhibiting different directions in relation to one another, thereby consisting a framework scaffold junction.

6. The method of claim 4, wherein said bevel angles are approximately equal value on the sleeve and annular part.

7. The method of claim 1 wherein said external and internal shapes are irregular.

8. The method of claim 1 wherein said annular element has at least one thin portion.

* * * * *